May 28, 1940.  M. E. MOREAU ET AL  2,202,593
COMBINATION RANGE AND VIEW FINDER
Filed May 5, 1939   3 Sheets-Sheet 1
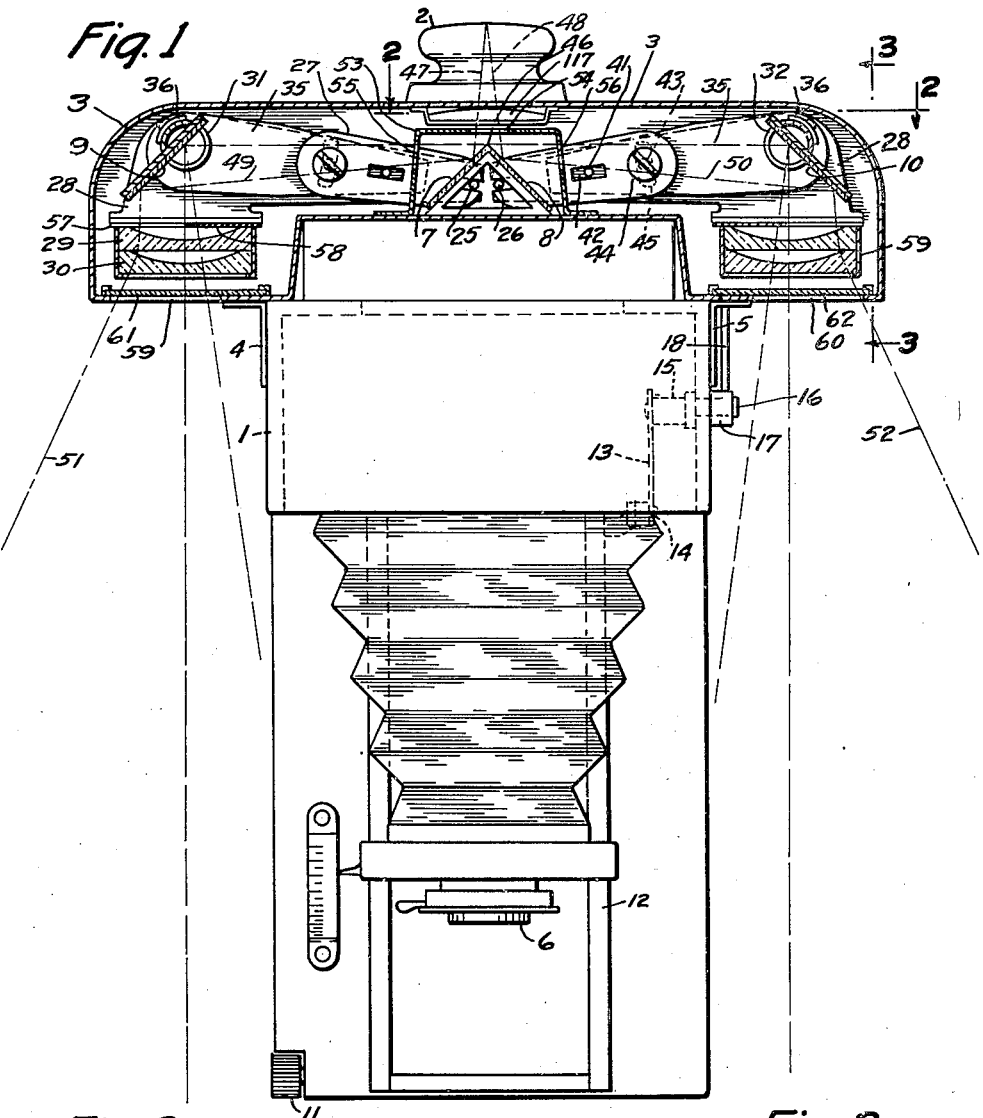
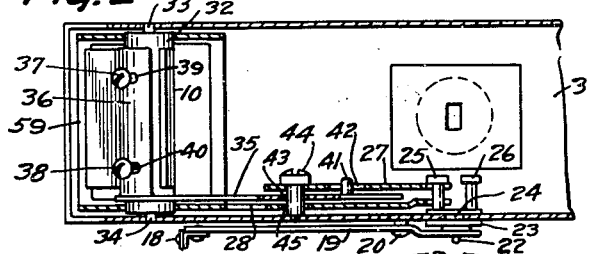
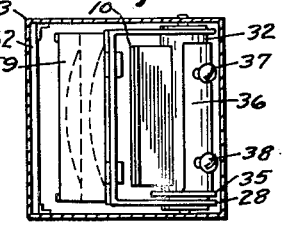
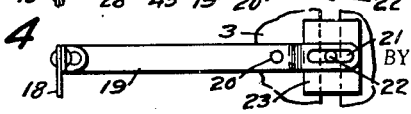
INVENTORS
Marcel E. Moreau
& David Landfield
James Harrison Bowen
ATTORNEY.

May 28, 1940.  M. E. MOREAU ET AL  2,202,593
COMBINATION RANGE AND VIEW FINDER
Filed May 5, 1939   3 Sheets-Sheet 2
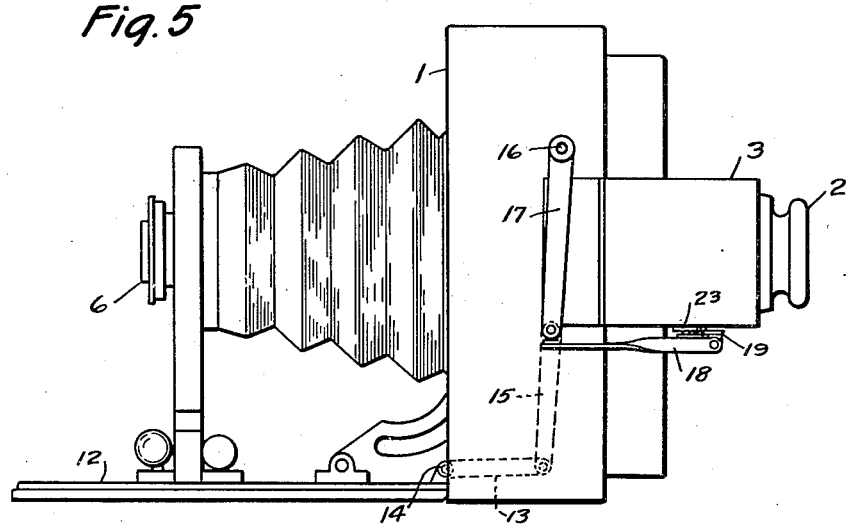
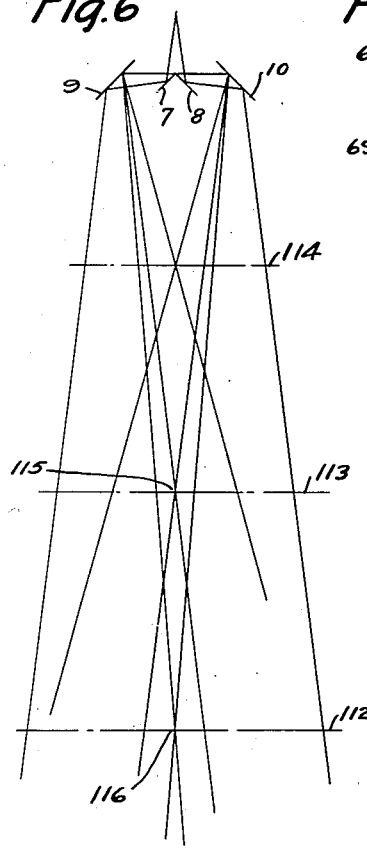
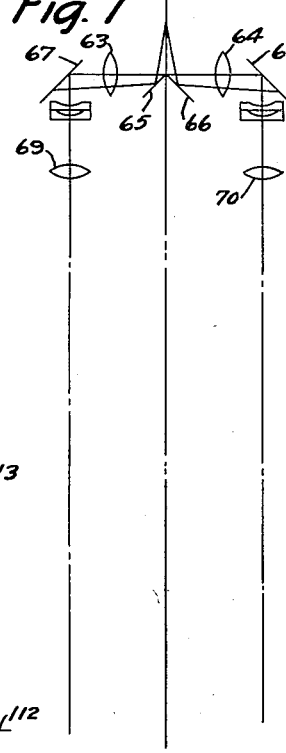
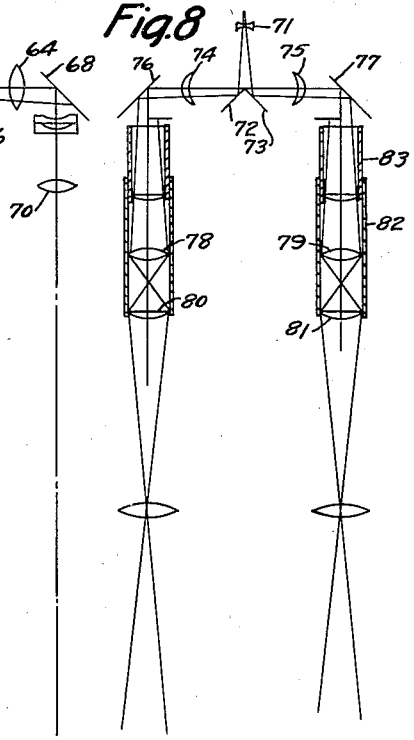
INVENTORS.
Marcel E. Moreau
& David Landfield
BY
James Harrison Bowen
ATTORNEY.

May 28, 1940.  M. E. MOREAU ET AL  2,202,593
COMBINATION RANGE AND VIEW FINDER
Filed May 5, 1939   3 Sheets-Sheet 3
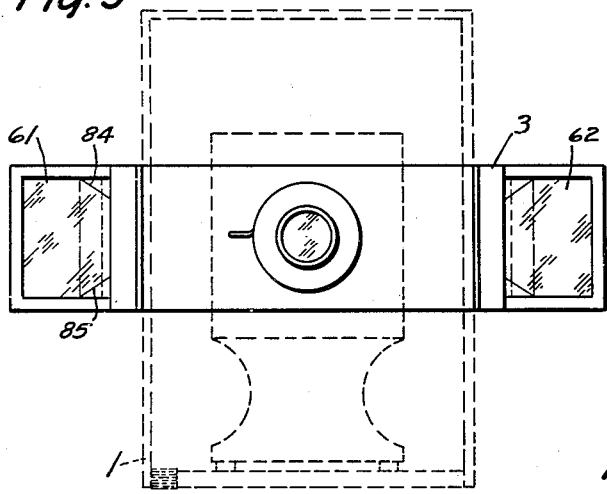
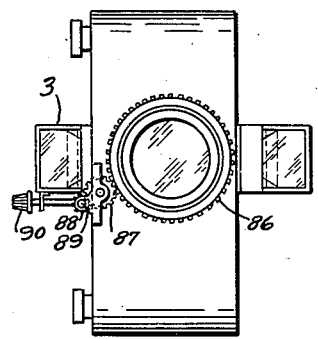
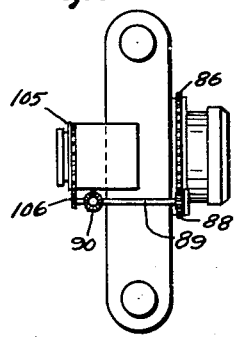
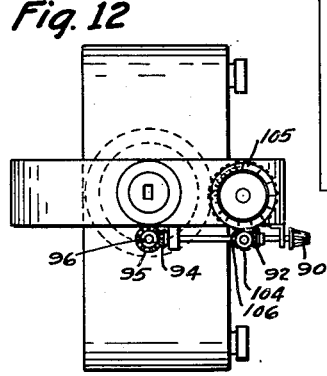
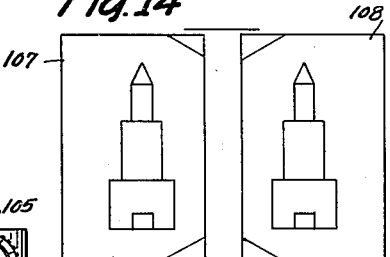
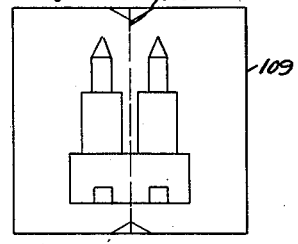
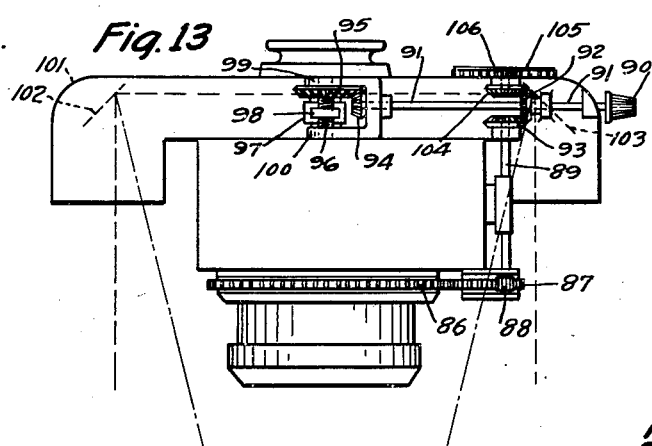
INVENTORS.
Marcel E. Moreau
& David Landfield
BY James Harrison Bowen
ATTORNEY.

Patented May 28, 1940

2,202,593

UNITED STATES PATENT OFFICE 2,202,593

COMBINATION RANGE AND VIEW FINDER

Marcel E. Moreau, New York, and David Landfield, Bronx, N. Y.

Application May 5, 1939, Serial No. 271,982

5 Claims. (Cl. 95—44)

The purpose of this invention is to provide an improved combination range and view finder of the type used in combination with cameras, guns, or the like, by which a camera or device may be held on the level of the eye and an object or view brought into focus and at the same time positioned in the frame or lens, or on the axis thereof, with the axis of the lens aligned with the eye instead of the eye being located to one side thereof or above or below the lens.

The invention is a combination focusing and view finder having an eye piece positioned at the back of the camera directly behind the lens, with reflecting mirrors also in line with the lens positioned at both sides of the camera, with means adjusting the angles of the mirrors at the sides synchronized with the means adjusting the lens to bring the two halves of a view or object together on the vertical axis of the lens when corresponding with the focus thereof, and in combination with the reflecting mirrors, lenses, and also telescoping devices may be used for extending the range of the device, and the additional lenses and telescoping devices may also be adjusted in combination with the reflecting mirrors, although due to the angle of sequence, these move twice the distance of the reflecting mirrors.

In ordinary photography, many devices have been provided in combination with cameras generally known as view finders, however these are usually positioned at one side or above the lens, and then it is necessary for the photographer to guess the exact position of the picture, and, where focusing devices have been used, it is necessary to estimate the distance for the proper focus, or first obtain the focus and then shift to another device to locate the picture; and, therefore, it is desirable to combine these different movements and at the same time place the eye piece on the axis of the lens so that, with one movement, the view or object may be positioned and focused, and while in the same position the exposure may be made.

The object of this invention is, therefore, to provide a combined range and view finder with the eye or sight piece aligned with the lens of a camera or other device in which a focusing and view or object locating means are operated with a single movement.

Another object is to provide means for focusing and positioning a view or object in combination with a camera which may be operated and also in which the exposure may be made with the camera at the eye level.

Another object is to provide a combined range and view finding device in which the sight or eye piece is located behind an instrument and on the central axis thereof.

Another object is to provide a combined range and view finder which may be adapted for relatively long distance use.

A further object is to provide a combined range and view finder which is of a simple and economical construction.

With these ends in view the invention embodies an attachment positioned at the back of a camera with the eye piece directly behind and on the axis of the lens of the camera, with reflecting surfaces in the center of the back and others extending beyond the sides of the camera, and with the reflecting surfaces extending beyond the sides adjustable with the lens. The device may also be provided with independent lenses or telescopic devices for extending the focal limit.

Other features and advantages of the invention will appear from the following description taken in connection with the drawings, wherein:

Figure 1 is a view showing a plan view of a camera with the device attached thereto, in which the device is shown in section.

Figure 2 is a section through the device taken on line 2—2 of Figure 1 with parts omitted and parts broken away.

Figure 3 is an end view showing a section through the end of the device approximately on line 3—3 of Figure 1.

Figure 4 is a detail showing a slider on the bottom of the casing of the device for operating the reflecting surfaces and lenses.

Figure 5 is a view showing a side elevation of a camera with the device attached thereto.

Figure 6 is a diagrammatic view showing a simple form of the device, in which reflecting surfaces only are illustrated.

Figure 7 is a similar view showing lenses in combination with the reflecting surfaces for increasing the range thereof.

Figure 8 is a similar view showing telescopic devices in combination with the reflecting surfaces for adapting the device to long range use.

Figure 9 illustrates a front view of the device with an outline of the camera shown in dotted lines.

Figure 10 is a similar view showing the device on a miniature camera.

Figure 11 is a view showing a side elevation of the camera shown in Figure 10.

Figure 12 is a rear view of the camera shown in Figure 10.

Figure 13 is a view looking upward, showing the under side of the device illustrated in Figure 10.

Figure 14 illustrates objects observed through the eye piece with the lens and reflecting surfaces extending outward and not in focus.

Figure 15 is a similar view showing how the objects are brought together when drawing the lens inward to focus the device.

Figure 16 is a similar view showing an object exactly in focus in which both halves are equidistant from a center.

In the drawings the device is shown as it may be made, wherein numeral 1 illustrates a camera on which the device may be used, numeral 2, an eye or sight piece, and numeral 3, a casing in which the parts may be mounted.

It will be understood that this device may be used on a camera as indicated by the numeral 1 or a camera of any type, or it may also be used on a gun or other device for locating and focusing or where it is desirable to accurately determine the position and range of an object or view.

In the design shown in Figure 1, the casing 3 is attached to the camera 1 by clips 4 and 5, and this is mounted with the center of the eye piece 2 on the center of a lens 6 and in alignment therewith, and directly in front of the eye piece 2 are reflecting surfaces 7 and 8 preferably positioned at 45°, although any suitable angle may be used, and toward the sides of the camera are additional reflecting surfaces 9 and 10, with the angle of the reflecting surfaces 9 and 10 adapted to be adjusted in unison, and with the movement thereof synchronized with the movement of the lens 6. These reflecting surfaces are so positioned that, when looking into the member 2, an object or view will be viewed so that, with the lens extended and out of focus, the view or object will appear twice with one view thereof located on the surface 7 and the other view on the surface 8, and the surfaces 9 and 10 may be adjusted to bring the two views together so that their inner parts will appear to fold together until the exact center of each view will meet exactly on an imaginary central line, and, when in this position, the line will disappear and the exact focal point is determined.

The camera may, therefore, be held directly in front of the eye, and, by focusing the lens with the usual thumb nut 11, the reflecting surfaces 9 and 10 which are controlled by the movement of the lens are simultaneously adjusted to bring the object or view into exact focus, and, with the camera still held in front of the eye, the film may be exposed and the picture taken. The axis of the eye piece and consequently of the object or view on the reflecting surfaces is, therefore, exactly in line with the lens 6, and, with one-half of the object or view brought in from each side, a true picture is obtained exactly as viewed, and this picture is viewed in its true position, that is, with the top at the top and with each side at the proper side.

The lens 6 is mounted in the usual manner upon a traveling carriage 12, and this carriage is connected to the device by a link 13 connected to the carriage at the point 14, and this is pivotally attached to the lower end of a vertical lever 15 on a pin 16 extending through the wall of the camera, and on the outer end of the pin 16 is a lever 17 with the lower end connected to a link 18, the opposite end of which is connected to a pivoted lever 19 pivotally mounted on a pin 20, and the opposite end of the lever 19 is provided with a slotted opening 21 fitting over a pin 22 on a slider 23 in a slot 24 in the base of the casing, and it will be noted that, as the lens is moved backward and forward, this combination of levers will move the slider 23 backward and forward, thereby operating the levers controlling the positions of the reflecting surfaces.

The slider 23 is also provided with an inner plate having pins 25 and 26 thereon, and these pins extend into slots in the ends of levers 27 and 28, the levers in both sides being similar, and, therefore, the same reference numerals are used for both.

The reflecting surfaces may be used independently, however, it is preferred to use lenses in combination in order to extend the limit line of the view or picture and, therefore, lenses 29 and 30 are mounted on the ends of the levers 28, and these are positioned in front of the reflecting surfaces 9 and 10 and the levers arranged so that the lenses move twice the distance of that of the reflecting surfaces. This action is accomplished by a series of levers in which the reflecting surfaces are mounted upon tubes 31 and 32, with the tubes extending through the casing and pivotally mounted through pins 33 and 34, and these tubes form bearings for the levers 28. The tubes are adjustably connected to levers 35 through extensions 36 having slotted openings 37 and 38 therein, with screws 39 and 40 positioned in the openings and extending into the tubes 31 and 32, thereby making it possible to adjust the angle of the reflecting surfaces in relation to the levers 35 by which they are operated. The levers 35 are provided with pins 41 which extend into slots 42 in the levers 27, and the levers 35 are also provided with slots 43 through which studs 44 extend upon which the levers 27 are pivotally mounted, and, therefore, it will be noted that, with the outer ends of the levers 27 pivotally held on the studs 44, and with the inner ends moved by the pins 25 and 26, the pins 41 will be moved by the levers 27, and these will, therefore, move the levers 35, causing the reflecting surfaces to move. The lower levers 28 are also provided with slots 45 similar to the slots 43 in the levers 35, permitting the levers 28 to move under the studs 44, and, with the inner ends of the levers 28 adapted to be moved by the pins 25 and 26, these levers will move the lenses 29 and 30 as the slider 23 moves backward and forward. It will be understood, however, that any other means may be provided for mounting and operating the reflecting surfaces and lenses, however, it is necessary that the lenses travel twice the distance of the reflecting surfaces.

With the eye placed in the center of the sight or eye member 2, each half of the picture, object, or view, will be located on the section of the reflecting surfaces 7 and 8 bound by the vertex or point 46 and the point where the lines 47 and 48 strike the reflecting surfaces, and these points will indicate the outer sides of the view, traveling along the lines 49 and 50 to the reflecting surfaces, and then through the lenses extending outward on the lines 51 and 52 which may be considered as the limit lines. The reflecting surfaces 7 and 8 may be enclosed in a bracket 53 having a central opening 54 and side openings 55 and 56, and, as only half of the lenses 29 and 30 are used, the lenses may be provided with a member 57 forming a light gate with a closed portion 58 extending half-way across the lens. The lenses are illustrated as being mounted in thin casings 59 on the ends of the levers 28, however, it will be understood that these may be mounted in any manner and any number of lenses may be used. The front of the casing may also be provided with windows 59 and 60 having glass plates 61 and 62 mounted therein forming closures for the openings thereof.

It will be understood that reflecting surfaces only may be used as illustrated in Figure 6, however, lenses may also be used in combination with the reflecting surfaces as illustrated in Figure 1, and additional lenses may also be provided as shown in Figure 7, in which lenses 63 and 64 are provided between reflecting surfaces 65 and 66 and 67 and 68, and additional lenses 69 and 70 may be used in front of the reflecting surfaces, and these may be used in combination with the lenses 29 and 30 or independent thereof as may be desired. Figure 8 illustrates another alternate arrangement in which a lens 71 is provided before the reflecting surfaces 72 and 73 which correspond with the surfaces 7 and 8, and, in this design, additional lenses 74 and 75 are provided between the reflecting surfaces 72 and 73 and the surfaces 76 and 77, and, in addition to these, telescopic lenses 78, 79, 80 and 81 may be used, with the lenses 78, 79, 80 and 81 mounted in a telescoping casing 82 mounted on extensions 83 of a casing similar to the casing 3. It will, therefore, be understood that any combination of lenses for extending the range or limit of the device may be provided, and these may be used or arranged in any manner.

The windows at the front of the device, indicated by the numerals 61 and 62 are provided with diagonally positioned lines 84 and 85 which are so arranged that, when the camera is in focus, the diagonal lines from each side will meet at the center, and the point of intersection of these lines will indicate the upper and lower limits of the picture. These lines may be provided in any manner and located at any point or points.

In the design shown in Figures 10, 11, 12 and 13, the device is similar to that shown in the preceding figures except that, instead of connecting the reflecting surfaces to the lens through levers, these surfaces are connected through gears, and this particular arrangement is adapted for miniature cameras, or other cameras where the focus is obtained by turning the lens casing instead of moving the forward end of the camera backward and forward.

In this design, the lens mounting is provided with a gear 86, and a gear 87 is provided on the face of the casing which meshes with the gear 86 and also with a pinion 88 on a shaft 89, and the shaft 89 is rotated by a knob 90 on a shaft 91 through bevel gears 92 and 93. It will be noted that, as the knob is turned by the thumb and forefinger, the bevel gears will rotate the shaft 89, and this will rotate the pinion 88 and the gear 86 through the gear 87. At the same time, a bevel gear 94 also located on the shaft 91 and which meshes with a gear 95 will rotate a screw 96, and, as the screw 96 rotates, it will move a slider 97 backward and forward, the slider being similar to the slider 23 shown in Figures 2 and 4, and being provided with an extending nut 98 which is threaded on the screw 96. The screw 96 is mounted in bearings 99 and 100 on the under side of the casing 101 which is similar to the casing 1, and it will be noted that, as the slider is moved backward and forward, it will adjust the position of the reflecting surfaces indicated by the dotted lines 102 and 103 which are similar to the surfaces 9 and 10. The gear 92 also meshes with another bevel gear 104 on a shaft which rotates a graduated disc 105 through gears 106, and this disc is provided with numerals to indicate the focal distances, and the device may, therefore, be used to determine the distance of an object or point from the device, as, when it is exactly in focus, the distance will be indicated on the dial.

It will be noted that, in the design shown in Figures 10 to 13, the lens is positioned to one side of the center, and, therefore, the device is also positioned toward one side of the center, and it will be understood that the device may be located in the center or toward either side so that the center between the reflecting surfaces corresponds with the center or axis of the lens.

It will be understood that changes may be made in the construction and arrangement of the parts without departing from the spirit of the invention. One of which changes may be in the use of these parts in combination with a camera in which the parts are constructed in the camera instead of provided as a separate attachment, another may be in the use of other means for adjusting the position of the reflecting surfaces or lenses, and still another may be in the use of apparatus of this type for any other purpose.

The construction will be readily understood from the foregoing description. In use the device may be provided as a separate attachment as illustrated, and this may be provided in different sizes to accommodate different types of cameras and may be installed in the camera or may be manufactured as an integral unit thereof as may be desired. It will also be understood that this apparatus may be used for ascertaining the range of guns and may be directly applied to the gun, and in this case reflecting surfaces may be separated and located considerable distances toward the sides to facilitate obtaining the range; and it may also be used in airplanes or other objects and devices as may be desired.

In use the eye piece may be held in front of one eye, and, with the focusing device in one position, two halves of an object or view may be observed, whereas, when the device is in focus or as it approaches the focal point, these two halves will move together to form a complete picture, and when in focus the camera may be rotated about the axis without distorting the picture, thereby making it possible to prove the focus of substantially any object, picture, or device. When the adjusting means is turned so that the lens is extended beyond the focal point, two substantially complete pictures appear, as indicated in Figure 14, in which the pictures are indicated by the numerals 107 and 108, and, when the lens is drawn backward toward the focal point, the two pictures appear to fold together as shown in Figure 15 and indicated by the numeral 109, and then, when the lens reaches the exact focal point, the two halves merge together, showing a complete picture, and, when the two halves meet exactly so that the intersecting line indicated by the numeral 110 cuts the center of each picture and disappears, the eye will see only a complete picture as illustrated at 111 in Figure 16, and the camera may be rotated from the vertical to the horizontal position, and the picture will not be distorted, whereas, if the picture is not exactly in focus, the line will still appear and a break will occur therein as it is rotated about the center of the lens. It may be considered that the illustration shown in Figure 14 would appear on the line 112 in Figure 6, with the illustration 109 on the line 113, and with the picture 111 on the line 114 in which it is exactly in focus. It will be appreciated, however, that a complete picture may also be observed at the point 115 on the line 113, and another picture may be observed upon 116 on the line 112 because wherever the converging lines from the reflecting surfaces 9 and 10 intersect on the center line, a complete picture can be observed, and this will be in focus, the lines depending upon the range or distance from the camera to the object or view. This object or view may be enlarged by suitable lenses, as shown in Figures 7 and 8, and the eyepiece 62 may also be provided with a magnifying lens 117 shown in Figure 1, or lenses may be provided at any point or points to increase the range or use of the device.

The device is shown and described as being particularly adapted for cameras, guns, and the like, however, it may also be used for television and motion pictures, and the design, size, and arrangement thereof may be varied in accordance with the use to which it is put. As an illustration, the side reflecting surfaces may be spread to a distance of thirty feet or the like for long range guns, and the range may, therefore, be accurately determined, and this may be determined while sighting. The sizes, shapes, and angles of the reflecting surfaces and lenses may therefore be varied as desired.

Having thus fully described the invention, what we claim as new and desire to secure by Letters Patent is:

1. A camera having a lens, with a range and view finder mounted thereon, said range and view finder comprising an eye-piece in alignment with and on the axis of the camera lens, reflecting surfaces angularly positioned forming a V with the vertex thereof on the axis of and facing said eye-piece, side reflecting surfaces positioned beyond the sides of the camera remotely situated from the former reflecting surfaces cooperating with the former reflecting surfaces, each reflecting one-half of the object or field viewed through the eye-piece, each half being defined as extending from the center to one side and from end to end of the said object or field.

2. A range and view finder as described in claim 1, characterized in that the said side reflecting surfaces are adjustable.

3. In combination with a range and view finder as described in claim 1, lenses positioned ahead of said side reflecting surfaces.

4. A range and view finder as described in claim 1, having lenses in combination with said reflecting surfaces, and means adjusting the positions of the said side reflecting surfaces and lenses, said adjusting means moving the angle of the lenses twice the distance of the angle of the reflecting surfaces.

5. A camera range and view finder as described in claim 1, in which the camera is provided with means moving the lens for focusing, characterized by means adjusting the position of the said side reflecting surfaces with the focusing means whereby when the said halves register at the center forming a complete view the camera is in focus.

MARCEL E. MOREAU.
DAVID LANDFIELD.